June 4, 1963
J. M. HECK
3,091,829
CLAMP FOR CONNECTING TWO SUPERIMPOSED STEEL WIRE ROPE PARTS
Filed April 25, 1960
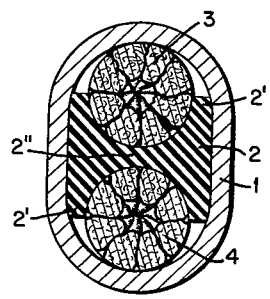
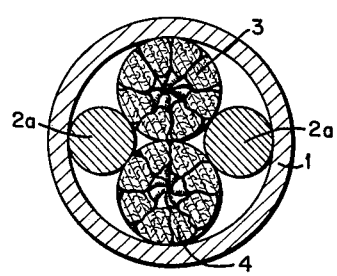
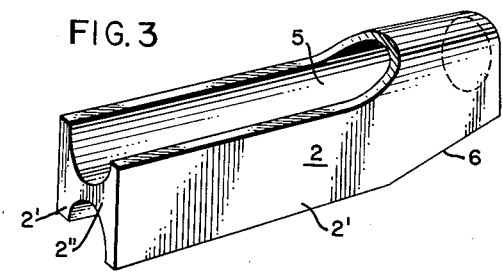
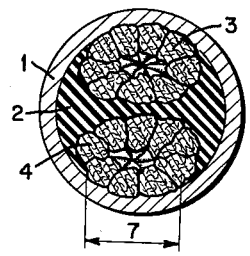
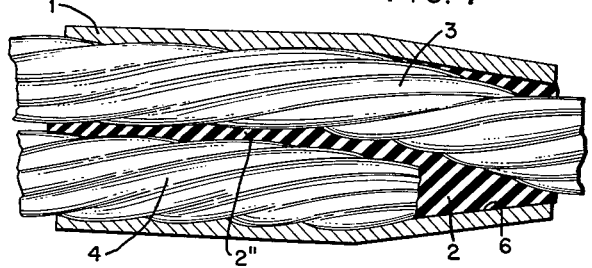
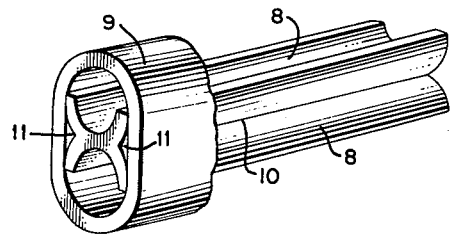
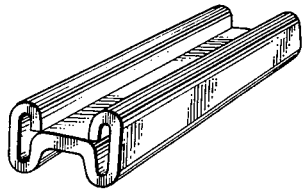
INVENTOR
JAN MARTINUS HECK
BY Marshall, Wilson, Blick & Yeasting
ATTORNEYS

United States Patent Office

3,091,829
Patented June 4, 1963

3,091,829
CLAMP FOR CONNECTING TWO SUPERIMPOSED
STEEL WIRE ROPE PARTS
Jan Martinus Heck, Plantage Middenlaan 74,
Amsterdam, Netherlands
Filed Apr. 25, 1960, Ser. No. 24,275
Claims priority, application Netherlands Apr. 25, 1959
1 Claim. (Cl. 24—123)

The present invention relates to a clamp for connecting two superimposed steel-wire rope parts in general, and, in particular, to a clamp comprising a substantially cylindrical metal sleeve for making an ear or loop in a steel-wire rope.

Such a clamp having an oval cross-section is known. Its longer axis is equal to the sum of the diameters of the rope parts to be clamped. Upon insertion of the rope parts to be connected, for example the running part and the re-inserted part when making an ear or a loop in a steel-wire rope, the clamp is compressed radially between two die-halves until the cross-section of the clamp has become substantially circular over its entire length.

In so doing the two rope parts are flattened and firmly pressed upon each other, while the material of the clamp, during the pressing action, penetrates over the whole circumference between the strands at the surface of the rope parts. The wedge-shaped spaces on both sides of the tangent between the two rope parts then have to be filled, in order to obtain an entirely tight connection which prevents the penetration of moisture into the clamp. In order to obtain this there is used as material for the clamp a metal or metal alloy, generally an aluminum alloy of such a low resistance to tensile stress and hardness that the clamp material when compressed flows entirely cold and the above-mentioned wedge-shaped spaces are filled. During the filling of the wedge-shaped spaces, the forces on the steel-wire must not be allowed to become excessive, in order to avoid damage to the rope parts. Metals having a Brinell-hardness of more than 35–45 kg./mm.$^2$ are not suitable because they either do not fill the wedge-shaped spaces or fill the spaces only at such a pressure that the material of the rope parts is damaged.

According to the present invention the sleeve, at least at the ends, is provided with two diametrically opposed inserts of readily deformable material. These inserts, when compressed by the sleeve in a radial direction, fill the two wedge-shaped spaces between the rope parts and the inner wall of the sleeve.

Use is made of two different materials having different functions. For the sleeve a metal, for example steel, having a resistance to tensile stress of at least 28 kg./mm.$^2$ and a Brinell-hardness of 70–100 kg./mm.$^2$ may be used. This metal bears the tensile forces occurring in the sleeve. For the readily deformable inserts use may be made of soft metals, such as tin, lead, copper and the like, or rubber, leather, nylon, polyvinyl chloride, polyethene or other yielding or elastic material which may entirely fill up the wedge-shaped spaces under small deformation forces and so produce an entirely water-tight connection.

The use of metals having higher resistance to tensile stress than the metals used hitherto for the sleeve has the advantage that the cross-section of the material of the sleeve required for taking the tensile forces may be considerably smaller. Therefore, over the prior well-known clamps, 50% in weight may be saved, so that the clamp according to the invention may be made more cheaply than the prior clamp, notwithstanding the use of additional inserts.

In a preferred embodiment of the clamp according to the invention two inserts are formed by the flanges adapted to the inner wall of the sleeve, the flanges being of a double T-profile having semi-cylindrical recesses to receive the rope parts at both sides of the web. The rope parts to be connected thus may be inserted more easily into the sleeve because the inserts are kept automatically in their correct place within the sleeve.

The previously known clamp has a further disadvantage in that the rope strands at the place where the running part emerges from the clamp are exposed to the phenomena of strong bending fatigue due to the fact that the impliable clamp contacts sharply the pliable emerging part of the rope. When making use of the clamp according to the invention this disadvantage is overcome for the greater part, since the running part of the rope, where it emerges from the clamp, is embedded in the easily deformable material of the inserts and the profile respectively. The above-mentioned disadvantage of the well-known clamp may be entirely removed by a further feature of the invention. That is, the flanges of the double T-profile at one side of the web are interconnected to form a cylindrical recess, while the flanges at the other side of the web are tapered. The stretch of the running part emerging from the clamp is thus embedded in a yielding or elastic mass and does not touch the sleeve.

Embodiments of the invention will now be described, by way of example, with reference to the accompanying drawing, in which:

FIG. 1 is a cross-section through one embodiment of a clamp according to the invention, before being compressed;

FIG. 2 is a cross-section through a clamp according to a second embodiment, also before being compressed;

FIG. 3 is a perspective view of an insert;

FIG. 4 is a longitudinal sectional view of a compressed clamp having a insert according to FIG. 3;

FIG. 5 is a cross-section of a clamp in compressed condition; and

FIGS. 6 and 7 are perspective views of two further embodiments of an insert.

In FIG. 1 there is shown a substantially cylindrical sleeve 1 of oval cross-section slightly conical at the ends, inside and outside. In the sleeve 1 there is an insert 2 of rubber, leather, nylon, polyvinyl chloride, polyethene or similar yielding or elastic material. The insert 2 is of substantially double T-shape in cross section and bears with flanges 2′ against the longitudinal side-walls of the sleeve 1. A connecting web 2″ forms two approximately semi-cylindrical recesses for receiving rope parts 3 and 4 to be connected. As shown in FIG. 1, the cross-section of sleeve 1 has internal semicircular ends of a radius greater than the radii of said wire rope parts. The insert 2 has outer faces as shown in cross section, spaced a distance substantially equal to twice the radius of the semicircular ends of the sleeve 1 so that those faces are adjacent the elongated portions of the oval cross-section of sleeve 1 and the longitudinal grooves in the insert faces between the outer faces are formed at no more than the depth of the radius of said wire rope parts to provide a substantial region of contact between those parts and the sleeve when the sleeve is swaged uniformly along its length to the form shown in FIG. 5.

In FIG. 2 the clamp is of cylindrical cross-section, and has two separate inserts 2a.

The insert of FIG. 3 at the right-hand end is provided with a cylindrical recess 5 by bringing the flanges 2′ at one side of the web 2″. At the opposite side of the web 2″ the flanges 2′ are tapered. The insert can thus easily be so fitted that the closed recess 5 is co-axial with the compressed clamp. This is shown in FIG. 4 in which a compressed clamp according to the invention is shown having an insert according to FIG. 3. The space between the end of the re-inserted rope part 4 and the running rope part 3 is entirely filled up by the material at a chamfered part 6 of the insert 2.

From FIG. 5 it can be seen that the rope parts 3, 4 in a compressed clamp only bear against the inner wall of the sleeve along the arc-length designated by 7, the rest of the rope parts 3, 4 being embedded entirely in the resilient or yielding material of the insert 2.

FIGS. 6 and 7 show two variations of the insert of FIG. 3. The insert 8 according to FIG. 6 has formed along the length of each flange a longitudinal V-groove 10 which engages the corresponding V-shaped longitudinal rib 11 on the inner side of each of the side walls of the sleeve 9. The ribs 11 form a thickening in the center of the side walls of the sleeve 9. As a result of this structure the side walls, during compression of the sleeve to a cylindrical shape, will always collapse inwardly, so that two semi-cylindrical dies can be used without auxiliary means to prevent the outward collapse of the relatively thin sleeve walls. The insert of FIG. 7 is formed of a flat strip of elastic material.

What is claimed is:

A clamp for being swaged or otherwise formed into a connecting member for two superimposed wire rope parts, comprising; a sleeve of swageable material having an interior wall and having a cross section with internal semicircular ends of a radius greater than the radii of said wire rope parts; an insert to be placed within said sleeve having outer faces spaced a distance substantially equal to twice the radius of the semicircular ends of said sleeve and having two longitudinally extending grooves formed in faces between said outer faces, said grooves being formed to no more than the depth of the radius of said respective wire rope parts; each groove being adapted to receive only one of said wire rope parts while maintaining a surface of said rope part bearing directly against said interior wall of said sleeve when said sleeve is swaged; said insert being of softer material than said sleeve and, when said sleeve is swaged uniformly over its length, adapted to fill up the space remaining between said rope parts and said interior wall of said sleeve after said rope part bears against said interior wall.

References Cited in the file of this patent

UNITED STATES PATENTS

| | | |
|---|---|---|
| 1,701,104 | Febrey | Feb. 5, 1929 |
| 2,252,448 | Van Nest | Aug. 12, 1941 |
| 2,869,906 | Person | Jan. 20, 1959 |

FOREIGN PATENTS

| | | |
|---|---|---|
| 622,561 | Germany | Dec. 19, 1935 |